(12) United States Patent
Morris

(10) Patent No.: US 9,021,388 B1
(45) Date of Patent: Apr. 28, 2015

(54) ELECTRONIC CALENDAR

(71) Applicant: Kevin Morris, Oxford, AL (US)

(72) Inventor: Kevin Morris, Oxford, AL (US)

(*) Notice: Subject to any disclaimer, the term of this patent is extended or adjusted under 35 U.S.C. 154(b) by 275 days.

(21) Appl. No.: 13/627,196

(22) Filed: Sep. 26, 2012

(51) Int. Cl.
*G06F 3/048* (2013.01)
*G04C 17/00* (2006.01)
*G04G 9/08* (2006.01)
*G06F 3/0481* (2013.01)

(52) U.S. Cl.
CPC .............. *G04G 9/087* (2013.01); *G06F 3/0481* (2013.01)

(58) Field of Classification Search
USPC .......................................................... 368/29
See application file for complete search history.

(56) References Cited

U.S. PATENT DOCUMENTS

| | | | |
|---|---|---|---|
| 5,307,086 A * | 4/1994 | Griffin et al. ................. | 715/808 |
| 6,064,975 A * | 5/2000 | Moon et al. .................. | 705/7.13 |
| 6,266,295 B1 | 7/2001 | Parker et al. | |
| 6,975,308 B1 | 12/2005 | Bitetto et al. | |
| 7,376,909 B1 * | 5/2008 | Coyle ........................... | 715/778 |
| D597,321 S | 8/2009 | Frankel et al. | |
| 7,721,229 B2 * | 5/2010 | Frankel et al. ................ | 715/835 |
| 8,793,611 B2 * | 7/2014 | van Os .......................... | 715/800 |
| 2003/0156138 A1 * | 8/2003 | Vronay et al. ................. | 345/772 |
| 2004/0044920 A1 * | 3/2004 | Hullot et al. ................... | 713/400 |
| 2005/0015483 A1 * | 1/2005 | Carter et al. .................. | 709/224 |
| 2005/0105374 A1 * | 5/2005 | Finke-Anlauff et al. ...... | 365/232 |
| 2006/0176524 A1 * | 8/2006 | Willrich ........................ | 358/474 |
| 2006/0224988 A1 * | 10/2006 | Bedingfield .................. | 715/774 |
| 2007/0040891 A1 * | 2/2007 | Calloway .................... | 348/14.01 |
| 2007/0073810 A1 * | 3/2007 | Adams et al. ................. | 709/205 |
| 2007/0229517 A1 * | 10/2007 | May et al. ..................... | 345/501 |
| 2008/0126930 A1 * | 5/2008 | Scott ............................. | 715/702 |
| 2008/0143890 A1 | 6/2008 | Rosencwaig et al. | |
| 2008/0218318 A1 * | 9/2008 | Boss et al. ............... | 340/309.16 |
| 2009/0175133 A1 | 7/2009 | Jiang | |
| 2011/0099316 A1 * | 4/2011 | Tseng et al. .................. | 710/304 |
| 2011/0128825 A1 | 6/2011 | Tanaka | |
| 2011/0165890 A1 * | 7/2011 | Ho et al. ..................... | 455/456.1 |
| 2011/0184974 A1 * | 7/2011 | Rawal et al. .................. | 707/769 |
| 2011/0239146 A1 * | 9/2011 | Dutta et al. ................... | 715/768 |
| 2012/0320716 A1 * | 12/2012 | DiMaggio et al. ............. | 368/29 |

* cited by examiner

*Primary Examiner* — Weilun Lo
*Assistant Examiner* — Stella E Higgs

(57) ABSTRACT

The present invention features an electronic calendar device. The device includes a touch screen, a mounting mechanism, a battery component, a memory and a microprocessor. The microprocessor causes the touch screen to display a default monthly calendar window on the screen, wherein the window takes the space of screen displaying the current month and a table comprising weekdays and dates. The user can select the desired date for event input. When the current date has an event, the microprocessor causes the default window automatically to shrink to the smaller window occupying the first half of the screen, and the event window pops up to occupy the remaining half of the screen and display the event content.

14 Claims, 6 Drawing Sheets

(Front ISO View)

(Back ISO View)

(Front View)

(Side View)

(Back View)

ELECTRONIC CALENDAR

FIELD OF THE INVENTION

The present invention related to an electronic calendar device, and more particularly to an electronic calendar device with event display and reminder function.

BACKGROUND OF THE INVENTION

Traditional hardcopy calendar can only be used one time. Moreover, a user has to write down event reminders such as birthdays and anniversaries. When the user forgets to keep calendar pages in pace with the current time, he/she will probably the event. Therefore, there is a need for an electronic calendar which can show a dynamic calendar date with event reminder function.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features an electronic calendar device. The device includes a touch screen, a mounting mechanism, a battery component, a memory and a microprocessor. The microprocessor causes the touch screen to display a default monthly calendar window on the screen, wherein the window takes the space of screen displaying the current month and a table comprising weekdays and dates. The user can select the desired date for event input when the current date has an event, the microprocessor causes the default window automatically to shrink to the smaller window occupying the first half of the screen, and the event window pops up to occupy the remaining half of the screen and display the event content.

DESCRIPTION OF PREFERRED EMBODIMENTS

Figure 1:
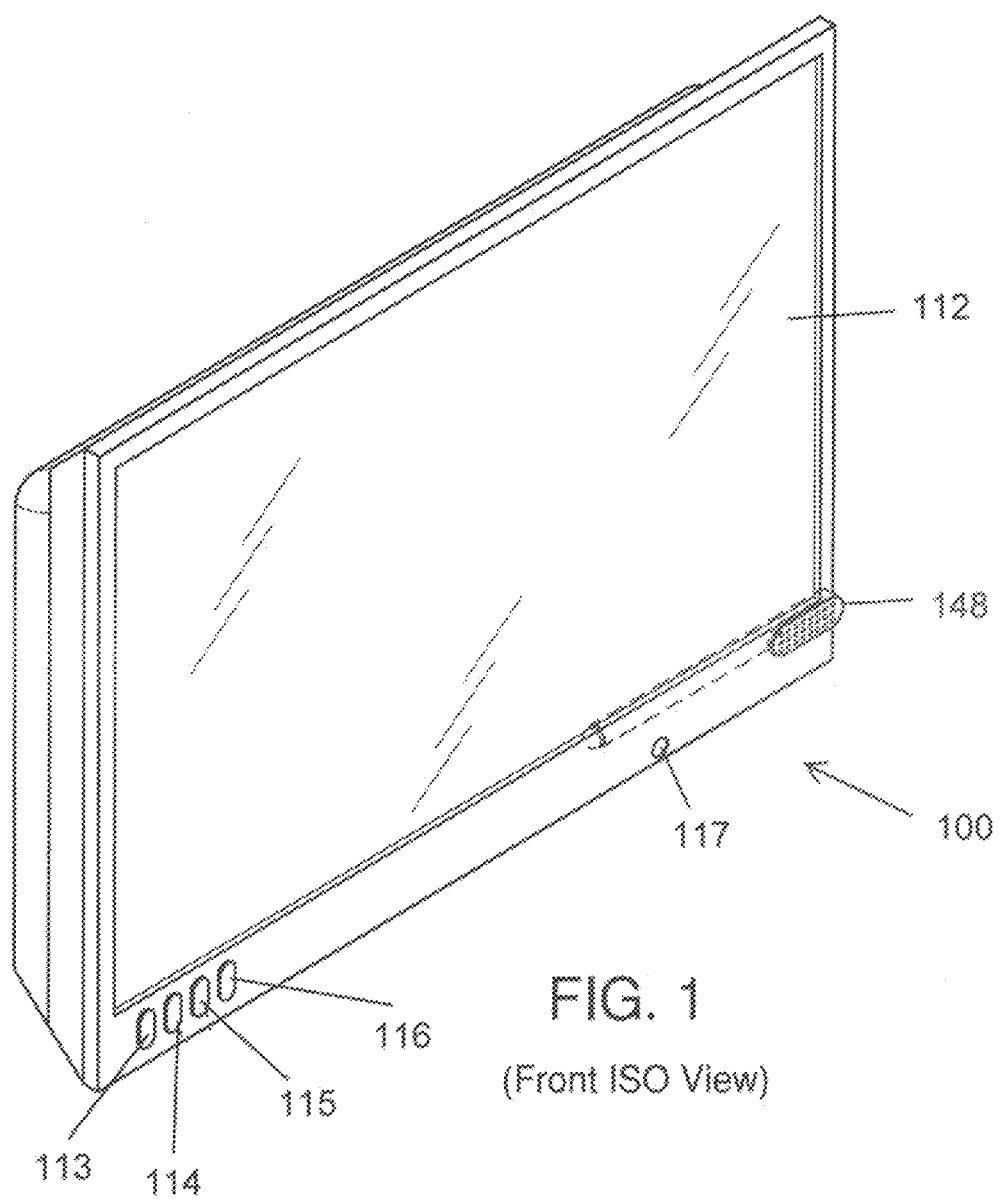
FIG. 1 shows a front view of an electronic calendar.
Figure 2:
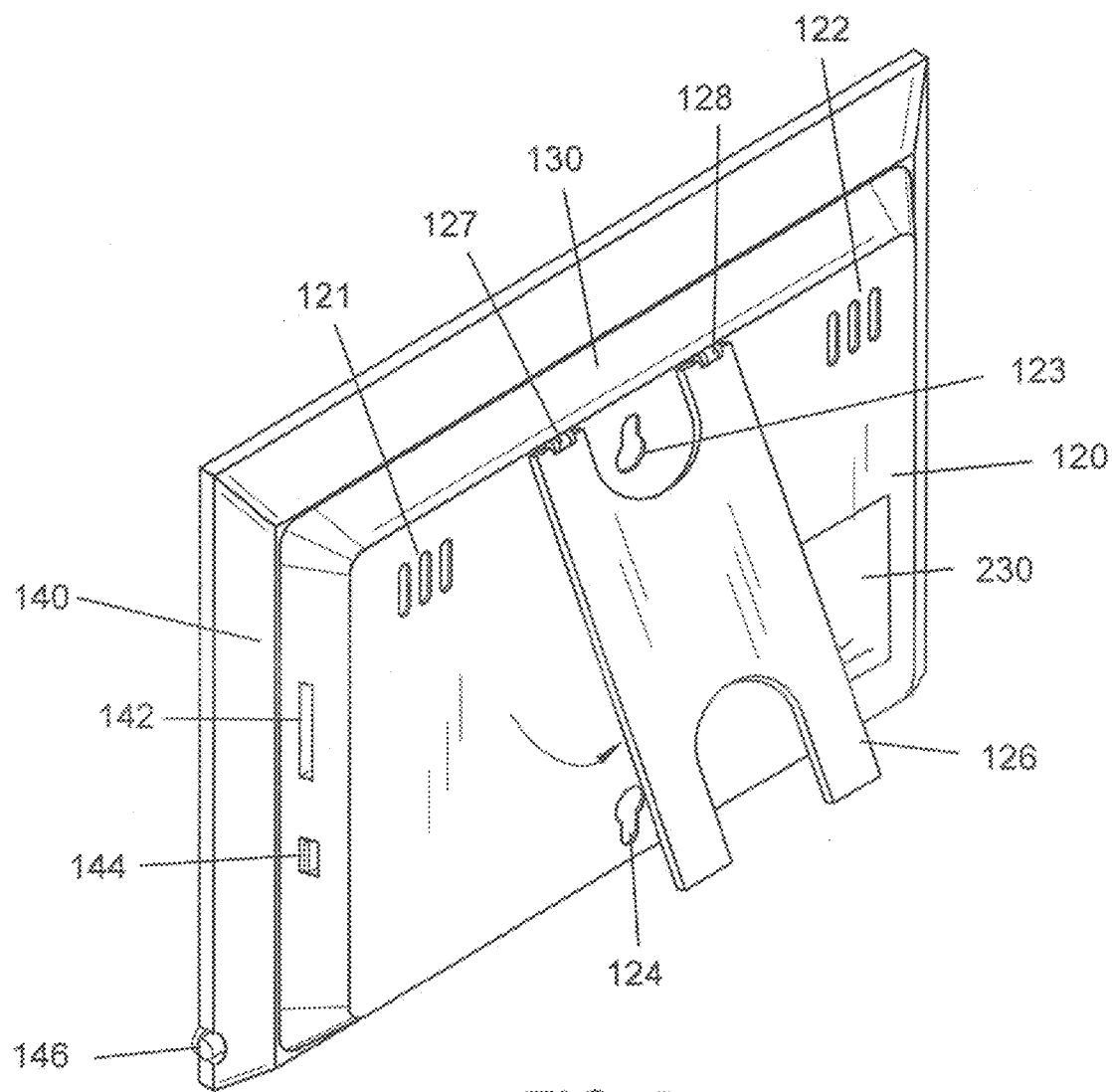
FIG. 2 shows a back view of an electronic calendar.
Figure 3:
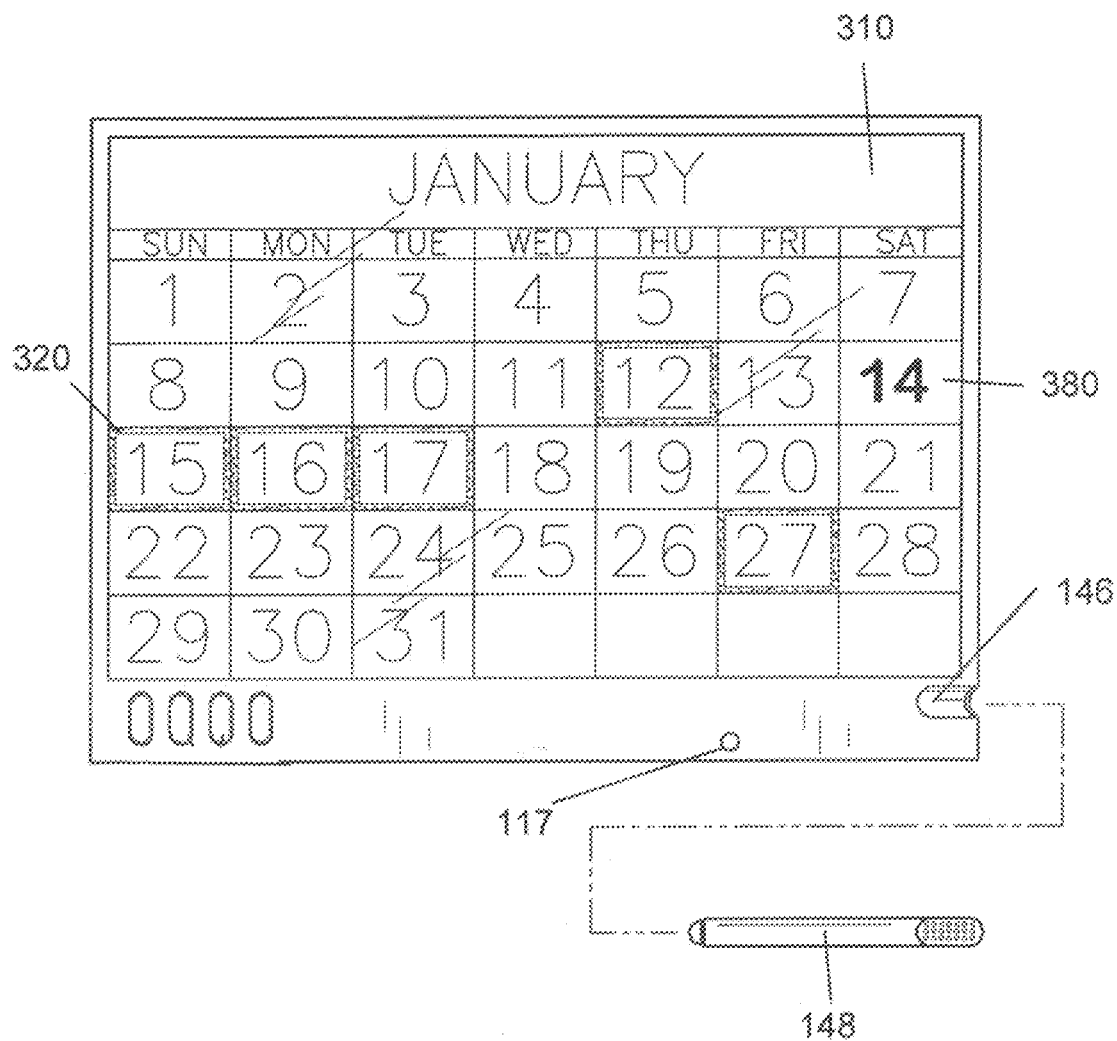
FIG. 3 shows a front view of an electronic calendar with date display.
Figure 4:
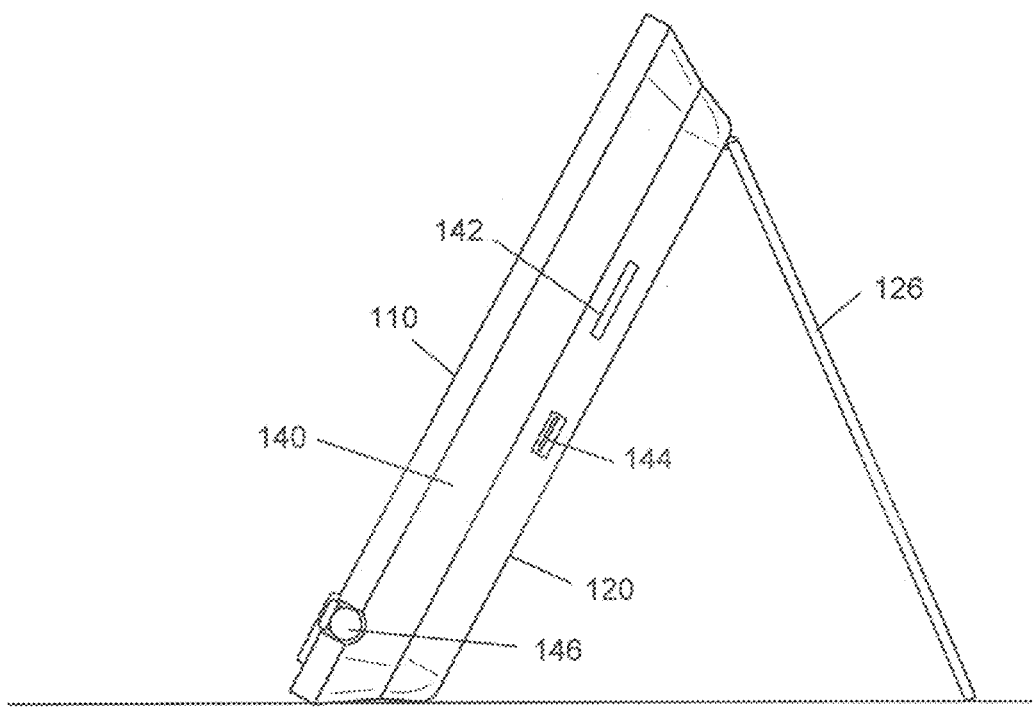
FIG. 4 shows a side view of an electronic calendar.
Figure 5:
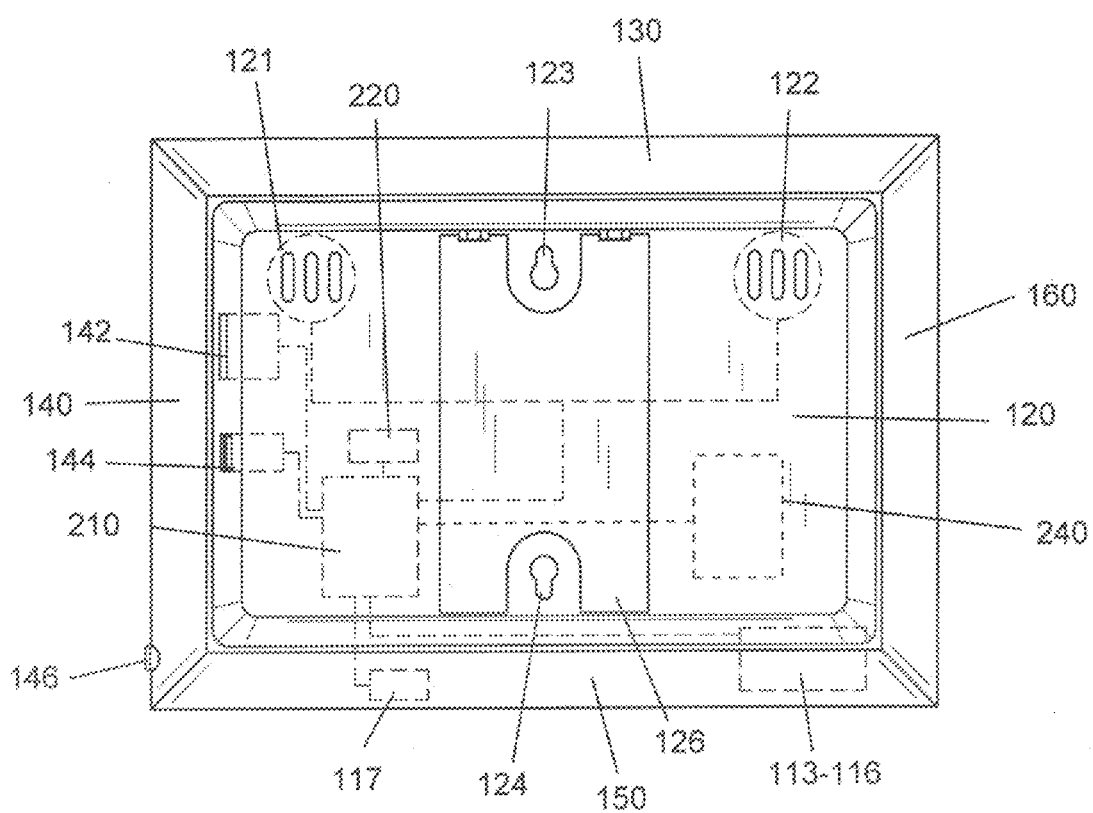
FIG. 5 shows a component view of an electronic calendar.
Figure 6:
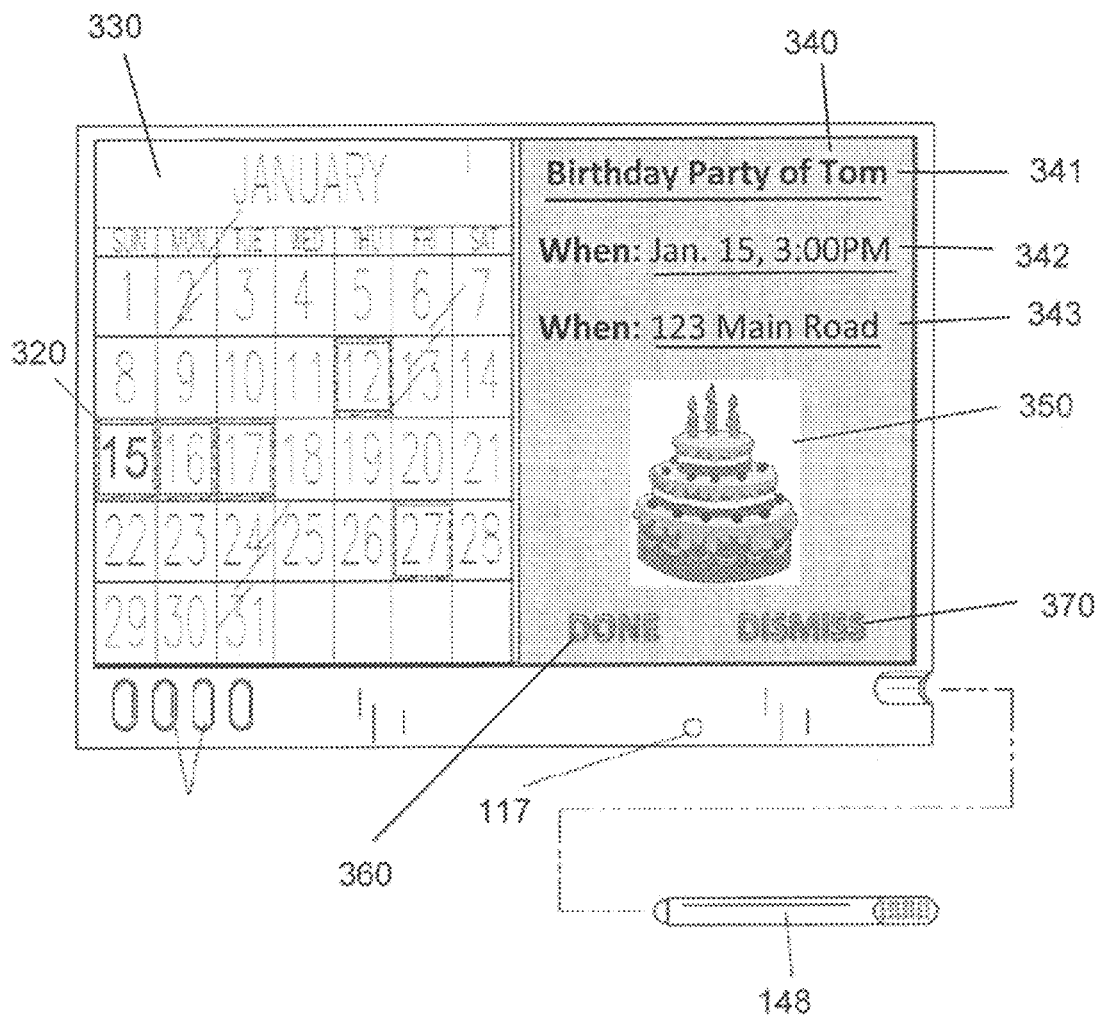
FIG. 6 shows a front view of an electronic calendar with date display and event display.

Referring now to FIG. 1-6, the present invention features an electronic calendar system comprising an electronic calendar device (100). The device includes a touch screen (110), a mounting mechanism, a battery (240), a memory (220) and a microprocessor (210), the microprocessor causes the touch screen to display a default monthly calendar window (310) on the screen, wherein the window (310) takes the space of screen displaying the current month and a table comprising weekdays and dates. The user can select the desired date for event input. When the current date has an event, the microprocessor causes the default window (310) automatically to shrink to the smaller window (330) occupying the first half of the screen, and the event window (340) pops up to occupy the second half of the screen and display the event content.

The calendar device (100) comprises a front side (110), a back side (120), a top side (130), a bottom side (150), a first side (140) and a second side (160). A touch screen (112) is disposed on the front side (110). A first, second, third and fourth control buttons (113-116) are disposed on the lower end of the front surface. At least one mounting mechanisms disposed on the back side (120), wherein a battery compartment (230) is disposed on the back surface, wherein at least one battery (240) resides within the battery compartment. A memory (220) disposed inside the electronic calendar device (100). A microprocessor (210) disposed inside the electronic calendar device (100), wherein the microprocessor operatively connects to the memory (220), display (112), and battery (240).

The microprocessor is configured to send a first signal to the touch screen to display a default monthly calendar window (310) on the screen, wherein the window (310) takes the space of screen displaying the current month and a table comprising weekdays and dates; wherein the calendar window (310) highlights current date (380) and the dates (320) which a user identified as event days; wherein the event date before current date is highlighted as a first means, wherein the event date after the current date is highlighted as a second means. In some embodiments, the calendar window highlights the current date with a certain marks such as a bold number, a highlighted cell, etc. In some embodiments, the first highlight means is highlighted date text with a first color, such as grey or a highlighted cell frame with a first color; the second highlight means is highlighted date text with a second color, such as red, or a highlighted cell frame with a second color.

A first, second, third and fourth control buttons (113-116) are disposed on the lower end of the front surface. When the user presses the first button (113), the microprocessor receives the input and causes the touch screen to display the calendar window of previous month. When the user presses the second button (114), the microprocessor receives the input and causes the touch screen to display the calendar window of next month.

After the user taps a desired date for event input, the touch screen receives the user's input and forwards the input to the microprocessor, the microprocessor then sends a second signal to the touch screen to shrink the default calendar window (310) to a smaller window (330) occupying the first half of the screen (for example, left half), and pop up an event window (340), wherein the event window occupies the second half of the screen (for example right half); wherein the user can input the title (341), time (342) and location (343) via the touch screen; wherein the user taps the desired date again on the smaller window (330), the touch screen receives the user's input and forwards the input to the microprocessor, the microprocessor then sends a third signal to the touch screen to switch back to the default calendar window (310) and save the event input data.

When the current date (380) has an event, the microprocessor then sends a fourth signal to the touch screen to shrink the default calendar window (310) to a smaller window (330) occupying the first half of the screen, and pop up an event window (340), wherein the event window occupies the second half of the screen; where the event window (340) further comprises a "DONE" button (360) and a "DISMISS" button (370), wherein the user clicks the "DONE" button to mark that the event has been taken care of, the touch screen receives the user's input and forwards the input to the microprocessor, the microprocessor then sends a fifth signal to the touch screen to switch back to the default calendar window (310); wherein the user clicks the "DISMISS" button to dismiss or cancel the event, the touch screen receives the user's input and forwards the input to the microprocessor, the microprocessor then sends a sixth signal to the touch screen to switch back to the default calendar window (310).

In some embodiments, the system further comprises a USB port (144) disposed on the first side (140) of the electronic calendar device, wherein the USB port is operatively connected to the microprocessor (210). The USB port can be used to charge the battery (240) via external power supply.

In some embodiments, the system further comprises a secure card input port (142) disposed on the first side (140) of the electronic calendar device, wherein the secure card input port is operatively connected to the microprocessor (210). The secure card input port (142) can read or write SD card, MiniSD card, Flash card, microSD card.

In some embodiments, the event window (340) further comprises a theme picture (350). The theme picture (350) is chosen by the user from a plurality of pictures stored within the memory (220). In some embodiments, the user can choose pictures from external sources via connection from the USB port (144) or card port (142). For example, the theme picture can be a birthday candle cartoon picture or a photo of the human being in the event of a birthday party.

In some embodiments, the system further comprises speakers for sound output. Two or more speakers are preferred for stereo sound effects. In some embodiments, a first speaker (121) and a second speaker (122) are disposed on the back side (120) of the electronic calendar device, wherein the speakers are operatively connected to the microprocessor (210). The microprocessor causes the speakers to play some music when the event window (340) pops out.

When the user presses the third button (115), the microprocessor receives the input and causes the speakers to increase the volume. When the user presses the fourth button (116), the microprocessor receives the input and causes the speakers to decrease the volume. If the user press and hold the fourth button (116) for a pre-determined time period, the microprocessor receives the input and causes the speakers to be mute.

In some embodiments, the user can choose music files from a plurality of music files stored within the memory (220). In some embodiments, the user can choose music files from external sources via connection from the USB port (144) or card port (142). For example, the music can be a "Happy birthday" song in the event of a birthday party.

In some embodiments, the system further comprises a Wi-Fi sensor (117) disposed on the front side of the electronic calendar device. The Wi-Fi sensor (117) is operatively connected to the microprocessor to enable the device to have Wi-Fi connection ability with external devices wirelessly.

In some embodiments, the system further comprises a stylus (148). In some embodiments, the electronic calendar device (100) comprises a pocket (146) for the stylus, wherein the pocket opening is disposed on the first side (140).

In some embodiments, the mounting mechanisms are a first wall mounting hole (123) and a second wall mounting hole (124) disposed on the back side of the electronic calendar device. In some embodiments, the first wall mounting hole (123) and second second wall mounting hole (124) are aligned vertically.

In some embodiments, the system further comprises a stand (126), wherein the stand (126) is pivotably attached to top edge of the back side (120) via a first hinge (127) and a second hinge (128).

The disclosures of the following U.S. Patents are incorporated in their entirety by reference herein: U.S. Pat. No. D597,321, U.S. Pat. No. 6,064,975, U.S. Pat. No. 6,266,295, U.S. Pat. No. 6,975,308, US patent application publication 2011/0128825 A1, US patent application publication 2008/0143890. US patent application publication 2009/0175133.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An electronic calendar system with event display and reminder function, the system comprising:
   (i) a calendar device (100) comprising:
   (a) a front side (110), a back side (120), a top side (130), a bottom side (150), a first side (140) and a second side (160);
   (b) a touch screen (112) is disposed on the front side (110), a first, second, third and fourth soft key control buttons (113-116) are disposed on the lower end of the front surface of the device and below the touch screen;
   (c) at least one mounting mechanism disposed on the back side (120), a battery compartment (230) is disposed on the back surface, wherein at least one battery (240) resides within the battery compartment;
   (d) a memory (220) disposed inside the electronic calendar device (100);
   (e) a microprocessor (210) disposed inside the electronic calendar device (100), the microprocessor operatively connects to the memory (220), display (112), battery (240), the first, second, third and fourth soft key control buttons (113-116);

the microprocessor sends a first signal to the touch screen to display a default monthly calendar window (310) on the screen, the window (310) takes the space of screen displaying the current month and a table comprising weekdays and dates; the calendar window (310) highlights current date (380) and the dates (320) which a user identified as event days; the event date before current date is highlighted as a first highlight means, the event date after the current date is highlighted as a second highlight means;

after the user taps a desired date for event input, the touch screen receives the user's input and forwards the input to the microprocessor, the microprocessor then sends a second signal to the touch screen to shrink the default calendar window (310) to a smaller window (330) occupying the first half of the screen, and pop up an event window (340), the event window occupies the second half of the screen; the calendar window (310) shrinks to a smaller window (330) such that the calendar window (310) and the event window (340) occupy equal sections of the touch screen, the title (341), time (342) and location (343) are inputted via the touch screen; when the user taps the desired date again on the smaller window (330), the touch screen receives the user's input and forwards the input to the microprocessor, the microprocessor then sends a third signal to the touch screen to switch back to the default calendar window (310) and save the event input data;

when the current date (380) has an event, the microprocessor then sends a fourth signal to the touch screen to shrink the default calendar window (310) to a smaller window (330) occupying the first half of the screen, and pop up an event window (340), the event window occupies the second half of the screen; the event window (340) further comprises a "DONE" button (360) and a "DISMISS" button (370), when the user clicks the "DONE" button to mark that the event has been taken care of, the touch screen receives the user's input and forwards the input to the microprocessor, the microprocessor then sends a fifth signal to the touch screen to switch back to the default calendar window (310); when the user clicks the "DISMISS" button to dismiss or cancel the event, the touch screen receives the user's input and forwards the input to the microprocessor, the microprocessor then sends a sixth signal to the touch screen to switch back to the default calendar window (310); and the mounting mechanisms are a first wall mounting hole (123) and a second wall mounting hole (124) disposed on the back side of the electronic calendar device, the first wall mounting hole (123) and second wall mounting hole (124) are aligned vertically such that the first wall mounting hole (123) is disposed at or near the top side (130) and the second wall mounting hole (124) is disposed below the first wall mounting hole (123) and at or near the bottom side (150) of the calendar device (100).

2. The system of claim 1, wherein the event window (340) further comprises a theme picture (350).

3. The system of claim 2, wherein the theme picture (350) is chosen by the user from a plurality of pictures stored within the memory (220).

4. The system of claim 1, wherein the system further comprises a USB port (144) disposed on the first side (140) of the electronic calendar device, wherein the USB port is operatively connected to the microprocessor (210).

5. The system of claim 4, wherein the USB port is used to charge the battery (240) via external power supply.

6. The system of claim 1, wherein the system further comprises a secure card input port (142) disposed on the first side (140) of the electronic calendar device, wherein the secure card input port is operatively connected to the microprocessor (210).

7. The system of claim 1, wherein the system further comprises a first speaker (121) and a second speaker (122), wherein the speakers are disposed on the back side (120) of the electronic calendar device, wherein the speakers are operatively connected to the microprocessor (210).

8. The system of claim 7, wherein the microprocessor causes the speakers to play some music when the event window (340) pops out.

9. The system of claim 1, wherein the system further comprises a stylus (148).

10. The system of claim 9, wherein the electronic calendar device (100) comprises a pocket (146) for the stylus, wherein the pocket opening is disposed on the first side (140).

11. The system of claim 1, wherein the system further comprises a stand (126), wherein the stand (126) is pivotably attached to top edge of the back side (120) via a first hinge (127) and a second hinge (128).

12. The system of claim 1, wherein the first highlight means is highlighted date text with a first color, or a highlighted cell frame with a first color.

13. The system of claim 1, wherein the second highlight means is highlighted date text with a second color, or a highlighted cell frame with a second color.

14. An electronic calendar system with event display and reminder function, the system consisting of:
 (i) a calendar device (100) consisting of:
  (a) a front side (110), a back side (120), a top side (130), a bottom side (150), a first side (140) and a second side (160);
  (b) a touch screen (112) is disposed on the front side (110), a first, second, third and fourth soft key control buttons (113-116) are disposed on the lower end of the front surface of the device and below the touch screen;
  (c) at least one mounting mechanism disposed on the back side (120), a battery compartment (230) is disposed on the back surface, wherein at least one battery (240) resides within the battery compartment;
  (d) a memory (220) disposed inside the electronic calendar device (100);
  (e) a microprocessor (210) disposed inside the electronic calendar device (100), the microprocessor operatively connects to the memory (220), display (112), battery (240), the first, second, third and fourth soft key control buttons (113-116);

the microprocessor sends a first signal to the touch screen to display a default monthly calendar window (310) on the screen, the window (310) takes the space of screen displaying the current month and a table consisting of weekdays and dates; the calendar window (310) highlights current date (380) and the dates (320) which a user identified as event days; the event date before current date is highlighted as a first highlight means, wherein the event date after the current date is highlighted as a second highlight means;

after the user taps a desired date for event input, the touch screen receives the user's input and forwards the input to the microprocessor, the microprocessor then sends a second signal to the touch screen to shrink the default calendar window (310) to a smaller window (330) occupying the first half of the screen, and pop up an event window (340), the event window occupies the second half of the screen; the calendar window (310) shrinks to a smaller window (330) such that the calendar window (310) and the event window (340) occupy equal sections of the touch screen, the title (341), time (342) and location (343) are inputted via the touch screen; when the user taps the desired date again on the smaller window (330), the touch screen receives the user's input and forwards the input to the microprocessor, the microprocessor then sends a third signal to the touch screen to switch back to the default calendar window (310) and save the event input data;

when the current date (380) has an event, the microprocessor then sends a fourth signal to the touch screen to shrink the default calendar window (310) to a smaller window (330) occupying the first half of the screen, and pop up an event window (340), the event window occupies the second half of the screen; the event window (340) has a "DONE" button (360) and a "DISMISS" button (370), when the user clicks the "DONE" button to mark that the event has been taken care of, the touch screen receives the user's input and forwards the input to the microprocessor, the microprocessor then sends a fifth signal to the touch screen to switch back to the default calendar window (310); when the user clicks the "DISMISS" button to dismiss or cancel the event, the touch screen receives the user's input and forwards the input to the microprocessor, the microprocessor then sends a sixth signal to the touch screen to switch back to the default calendar window (310); and the mounting mechanisms are a first wall mounting hole (123) and a second wall mounting hole (124) disposed on the back side of the electronic calendar device, the first wall mounting hole (123) and second wall mounting hole (124) are aligned vertically such that the first wall mounting hole (123) is disposed at or near the top side (130) and the second wall mounting hole (124) is disposed below the first wall mounting hole (123) and at or near the bottom side (150) of the calendar device (100).

\* \* \* \* \*